Nov. 17, 1964 W. B. ELAM 3,157,336
METHOD OF MAKING A FLUID-TIGHT CONTAINER
BODY AND PRODUCT THEREOF
Filed Dec. 13, 1961
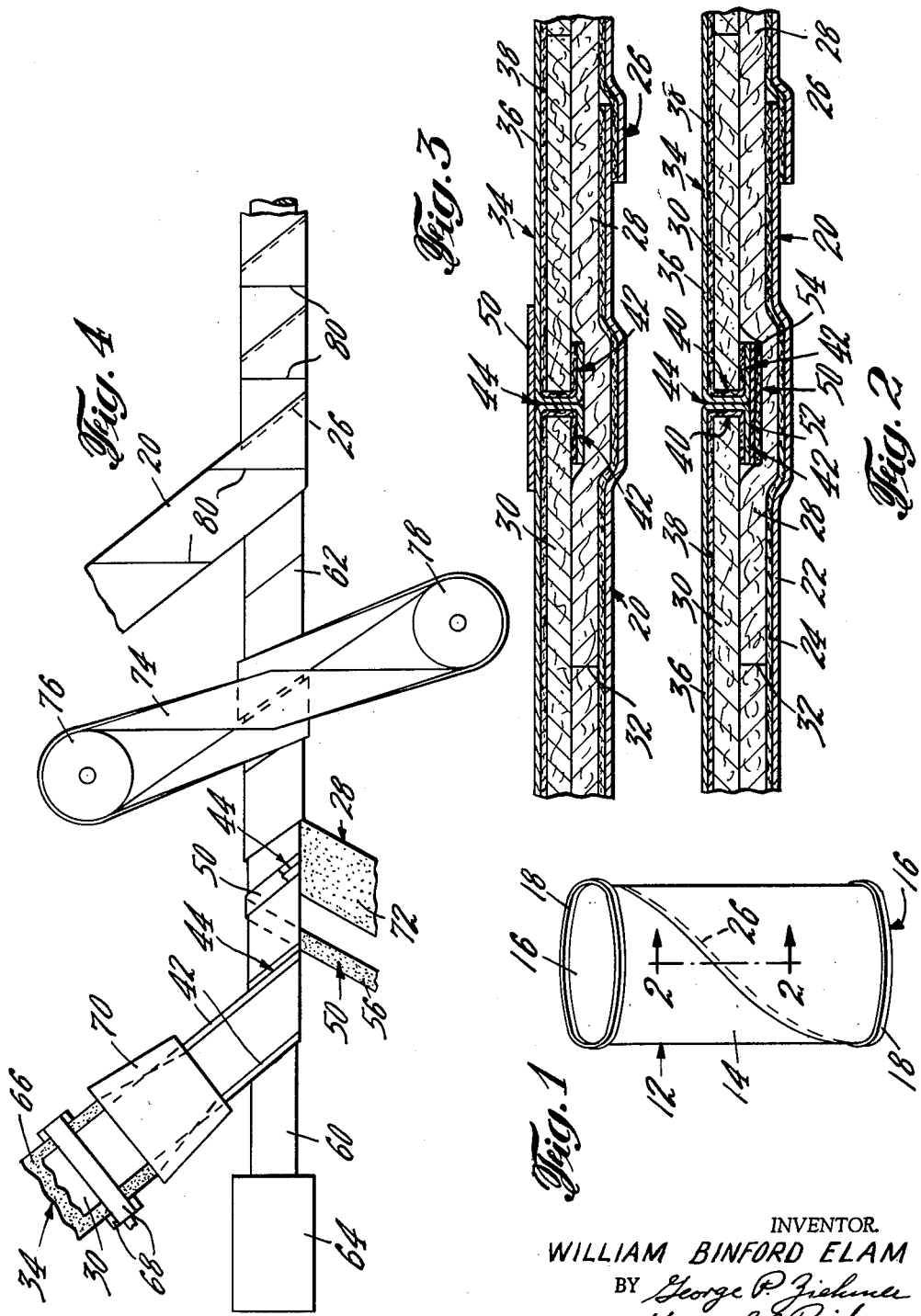
INVENTOR.
WILLIAM BINFORD ELAM
BY
ATTORNEYS 3,157,336
METHOD OF MAKING A FLUID-TIGHT CONTAINER BODY AND PRODUCT THEREOF
William Binford Elam, Oakland, N.J., assignor to American Can Company, New York, N.Y., a corporation of New Jersey
Filed Dec. 13, 1961, Ser. No. 158,985
3 Claims. (Cl. 229—4.5)

The present invention relates to spirally wound container bodies and has particular reference to such bodies which are provided with a novel interior helical seam construction which prevents the fluid product from wicking into the main body plies.

Recently great interest has been shown in the use of spirally wound fibre bodies in containers which need not be exposed to heat processing operations, the main reason for this interest residing in the fact that such bodies may be made cheaply and rapidly. Since many potential products for such containers contain either oil, grease, water or moisture, it is desirable that these bodies be lined in such manner as to provide a barrier which maintains the contained fluid out of contact with the fibrous body plies.

For many products, a sufficient degree of protection is provided in a spirally wound fibre body by forming the inner ply of the body of a lining material such as thin aluminum foil which is impervious to all fluids which are normally found in commercial packages. However, to reduce the cost of the containers, aluminum foil having a thickness of less than .0005 inch is normally used.

Foil of this thinness is very insubstantial and it is impractical to spirally wind it on commercially available equipment unless it is prelaminated to a strong backing material such as kraft paper. This kraft paper is, unfortunately, not impervious to fluids. Thus, when the kraft-backed foil liner ply is spirally wound in the usual manner, its edges are formed into a helical lap or butt joint wherein at least one of the edges of the kraft lining is exposed to the fluid product. As a result, the product wicks into the kraft lining and eventually reaches and impregnates the main fibrous body plies and weakens the container.

The present invention contemplates a solution to this problem by providing a spirally wound container body construction wherein the kraft-backed foil liner ply is made somewhat wider than the overlying body ply and the marginal edge portions of the liner ply are folded around the edges of the innermost main body ply to thereby remove the raw edges of the kraft backing from the inside of the body and thus eliminate its exposure to the product. The folding of these marginal edge portions of the liner ply results in their being disposed in a butt joint which opens into the interior of the container. To prevent the product from seeping through this butt joint and reaching the main body plies, the butt joint is sealed by a narrow impervious sealing ribbon which is secured to the edges of the foil liner on both sides of the butt joint.

In making this container body, the liner ply is prelaminated to the first body ply and its edges folded back around the edges of the narrow body ply to form a composite structure which is then butt wound helically around the forming mandrel of the spiral winder, after which the sealing ribbon is helically wound around this composite structure outwardly of the butt joint. Such a method can be readily practiced with a minimum number of changes to existing equipment to produce a fluid-tight body which is capable of holding many products.

An object of the invention, therefore, is the provision of a lined, spirally wound fibre container body wherein the fibrous body plies are shielded from the product within the container.

Another object is the provision of a spirally wound fibre container body which can be manufactured on existing spiral winding equipment and which can be made to hold products which contain oil, grease, water moisture, and/or other fluids, as required.

Yet another object is the provision of a simple method of making such a container.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a sealed container embodying a spirally wound, lined, fibre body embodying the principles of the instant invention;

FIG. 2 is a section through the body of the container of FIG. 1, the view being taken substantially along the line 2—2 of FIG. 1;

FIG. 3 is a section similar to that of FIG. 2, but showing a container body embodying a slightly modified form of the invention; and FIG. 4 is a schematic view illustrating the various steps in making the container body of FIG. 3 on a spiral winding machine by the method of the instant invention.

As a preferred and exemplary embodiment of the instant invetnion, FIG. 1 discloses a sealed container 12 which comprises a fibrous body 14 formed of a plurality of helically wound body plies. The opposite ends of the body 14 are closed by means of metal end members 16 which are attached thereto in leak-proof end seams 18. The seams 18 may be single or double seams of any suitable type.

The outer ply of the container body 14 comprises a helically wound label ply 20 (see FIG. 2) which is resistant to moisture and water to prevent deterioration of the container in the event it is exposed to water or dampness during shipment or storage. For this purpose, the label ply 20 preferably comprises an outer, thin aluminum foil 22 which is laminated to a supporting kraft paper backing 24. The edges of the label ply 20 are preferably overlapped in a lap joint 26.

The main wall portion of the body 14 is formed of two helically wound main body plies 28, 30 which are formed of a tough stock such as kraft board, chip board, or the like to provide adequate body strength. The edges of the outer main ply 28 are disposed in a helical butt joint 32 (see FIG. 2).

The body 14 also includes a helically wound liner ply 34, the inner surface of which is impervious to the product (not shown) which is contained in the container 12. The liner ply 34 preferably comprises a thin layer of aluminum foil 36 which is prelaminated to a kraft backing 38 which supports it and gives it strength so that it can be handled without tearing. The liner ply 34 is adhesively secured to the inner body ply 30 and is formed with marginal portions 40 which are bent at substantially right angles to the major portion of the liner ply 34 to cover the edges of the inner body ply 30 and then folded backwardly to form hems 42 which lie in face to face contact with the outer surfaces of the inner body ply 30, and adhesively secured thereto.

The marginal portions 40 of the liner ply 34 are disposed in abutting relationship to form a helical butt joint 44 which is offset from the butt joint 32 of the outermost body ply 28. As clearly seen in FIG. 2, the edges of the kraft liner backing 38 are disposed outwardly of the butt joint 44, and are not exposed to the product in the container.

However, the abutting liner edge portions 40 are not joined together, and as a consequence, the butt joint 44 in and of itself is not completely fluid-tight. To seal the butt joint 44 to thus prevent the fluid in the container from gaining access to the body plies 28, 30, a narrow, helically wound sealing tape or ribbon 50 which is impervious to the fluid is positioned outwardly of the butt joint 44 in face to face engagement with the folded back liner hems 42.

The sealing ribbon 50 preferably comprises an impervious inner layer of thin aluminum foil 52 which is laminated to a strong kraft backing 54, the foil layer 52 facing the foil layer 36 of the folded back liner hems 42 and being secured thereto by a hot melt thermoplastic or pressure-sensitive adhesive 56 (shown in FIG. 4 but not in FIG. 2) which is also impervious to the fluid product so that it prevents seepage of the product between the sealing ribbon 50 and the liner hems 42 and into the main body plies 28, 30. The particular adhesive used forms no part of the instant invention, as its composition may vary according to the requirements of the particular container body being made. One suitable adhesive is the polyamide adhesive disclosed in United States Patent 2,840,264 issued to James H. Groves. Among other types of adhesives which are suitable are those comprising copolymers of vinyl chloride and vinyl acetate, either alone or in admixture with maleic anhydride or vinyl alcohol modified vinyl chloride-vinyl acetate copolymers.

Although the sealing ribbon 44 is preferably formed of kraft-backed aluminum foil, it is not limited to such material and can be made of any suitable material which is impervious to the fluid product. Examples of such other materials are unbacked aluminum foil, other metallic foils, and plastics such as polyethylene, polypropylene, mylar, nylon, etc.

FIG. 3 discloses a body construction which is slightly different from the construction disclosed in FIG. 2 in that the sealing ribbon 50 comprises a heavier, unbacked strip of aluminum foil which is disposed on the inside of the butt joint 44 and is secured to the liner ply 34 on both sides of the butt joint 44 by an impervious adhesive to seal the joint 44 from the fluid product.

FIG. 4 discloses the preferred method of manufacturing the container body 12 wherein its various components are wound around a stationary mandrel 60 to form an elongated tube 62 which is severed into short sections which comprise individual bodies 12. One end of the mandrel 60 is anchored at one end in a block 64. The opposite end of the mandrel 60 is free and unsupported to permit discharge of the tube 62.

As the first step of the method, the outer surface of the liner ply 34 is coated with a suitable adhesive 66. The liner ply 34 and the narrower inner body ply 30 are then brought together in centered registration and pressed together by a set of pressure rolls 68 to laminate them together. Next, these plies are passed through a plow or folder 70 which folds the projecting edges of the liner ply 34 around the edges of the inner body ply 30. This folding action can be easily accomplished by means of stationary cam shaped guide surfaces which are incorporated in the folder 70.

The composite structure comprising the laminated liner and inner body plies 34, 30 is then butt wound onto the mandrel 60 to form the butt joint 44. To permit this, the body ply 30 should be sufficiently thin so that the folded edges of the liner ply 34 do not wrinkle during this winding operation. The sealing ribbon 50, the inner surface of which is coated with the impervious adhesive 56 is now wound onto the mandrel 60 in centered registration with the butt joint 44, after which the outer body ply 28 is butt wound onto the mandrel 60 to form the butt joint 32 which is offset from the butt joint 44. The inner surface of the outer body ply 28 is coated with a suitable adhesive 72 which adheres to the inner body ply 28 and to the kraft backing layer 54 of the sealing ribbon 50 to form a solid body structure.

The tube 62 then passes through an endless winding belt 74 which is looped around the mandrel 60 and makes tight driving engagement with the tube 62 to pull the various component plies of the tube onto the mandrel 60 and to move the tube 62 helically along the mandrel. The winding belt 74 is mounted on a driving drum 76 and an idler drum 78.

The label ply 20 is wound onto the mandrel 60 after the tube 62 emerges from beneath the winding belt 74, the inner surface of the label ply 20 being coated with an adhesive (not shown) to secure it to the outer body ply 28. The label ply 20 preferably is preprinted with individual label patterns which are disposed between the lines 80 and are printed an at angle to the edges of the label ply 20 so that after winding, they extend circumferentially around the tube 62 to form complete unitary body labels.

The completed tube 62 now moves off the free end of the mandrel 60 and is severed along the circumferential lines 80 to form individual bodies 12.

For the sake of clarity of illustration, the adhesives which secure the various components of the body 12 together are omitted in FIGURES 2 and 3.

It will be realized that the butt joint 44 can be sealed by means other than the preformed ribbons 50 of the FIGURES 2 to 4. As one suggested alternative, a narrow stripe of a sealing dope, a rubbery compound, or a molten plastic could be deposited or extruded onto the outside of the tube 62 to seal the butt joint 44, prior to the time the body ply 28 is wound onto the tube 62. Such a stripe could be placed so that it spans the butt joint 44 and adheres to the hems 42.

It will also be understood that the body 12 is not necessarily limited to having two main body plies, and that this number may be varied to meet specific packaging requirements.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:
 1. A fluid-tight container body for holding a fluid product, comprising:
  a helical body ply which is pervious to the fluid product,
  a helical liner ply disposed inwardly of said body ply and comprising an inner layer which is impervious to the fluid product and an outer backing layer which is pervious to the fluid product,
  said liner ply being wider than said pervious body ply and having its marginal edge portions folded outwardly around the edges of said body ply and disposed in a helical butt joint wherein the fluid impervious layers of said edge portions are in engagement;
  said marginal edge portions being folded backwardly over said body ply and having the pervious backing layers thereof disposed in face-to-face engagement with and adhesively secured to the outer surface of said body ply, and
  a helical sealing ribbon spanning said helical butt joint and comprising a layer which is impervious to the fluid product, said impervious ribbon layer being disposed in face-to-face engagement with said impervious liner ply layer on both sides of said butt joint and being adhesively secured thereto by an adhesive which is impervious to the fluid product to prevent passage of the fluid product through said butt joint.
 2. The container body of claim 1 wherein said impervious liner ply layer comprises aluminum foil and said pervious liner ply layer comprises a paper backing, and said impervious ribbon layer comprises aluminum foil and is disposed in face-to-face engagement with said folded back portions of said liner ply outwardly of said butt joint, said sealing ribbon layer being substantially mutually co-extensive with said folded back portions.

3. The container body of claim 1 wherein said impervious liner ply layer comprises aluminum foil and said pervious liner ply layer comprises a paper backing, and said impervious ribbon layer comprises aluminum foil and is secured to said liner ply inwardly of said butt joint.

References Cited in the file of this patent

UNITED STATES PATENTS

| | | |
|---|---|---|
| 1,885,587 | Burton | Nov. 1, 1932 |
| 1,973,317 | Hurley | Sept. 11, 1934 |
| 2,008,218 | McColl | July 16, 1935 |
| 2,891,714 | Vallas | June 23, 1959 |

FOREIGN PATENTS

| | | |
|---|---|---|
| 683,206 | Great Britain | Nov. 26, 1952 |
| 829,443 | France | Mar. 28, 1938 |